United States Patent [19]

Lewis, Jr.

[11] Patent Number: 4,542,408

[45] Date of Patent: Sep. 17, 1985

[54] DIGITAL DEGHOSTING SYSTEM

[75] Inventor: Henry G. Lewis, Jr., Trenton, N.J.

[73] Assignee: RCA Corporation, Princeton, N.J.

[21] Appl. No.: 528,262

[22] Filed: Aug. 31, 1983

[51] Int. Cl.$^4$ ............................................. H04N 5/21
[52] U.S. Cl. .................................... 358/167; 358/905
[58] Field of Search ................. 358/905, 166, 167, 36, 358/37

[56] References Cited

U.S. PATENT DOCUMENTS

| | | | |
|---|---|---|---|
| 4,025,772 | 5/1977 | Constant | 235/156 |
| 4,053,932 | 10/1977 | Yamaguti et al. | 358/167 |
| 4,314,277 | 2/1982 | Pritchard et al. | 358/167 |
| 4,435,823 | 3/1984 | Davis et al. | 375/14 |

OTHER PUBLICATIONS

An Article Entitled "A Digitalized Automatic Ghost Canceller" by J. Murakami, K. Ohzeki and K. Ogi Appearing on pp. 555-561 of the "IEEE Transactions on Consumer Electronics", vol. CE-25, Aug. 1979.

Primary Examiner—Michael A. Masinick
Assistant Examiner—E. Anne Toth
Attorney, Agent, or Firm—Eugene M. Whitacre; Paul J. Rasmussen; Peter M. Emanuel

[57] ABSTRACT

A deghosting system incorporated in a digital television signal processing system includes a number of channels for producing digital samples of psuedo ghost signals for cancelling digital samples of respective ghost components of a contaminated video signal. Each channel includes a random access memory into which digital video samples are read and later read out of at a time corresponding to the delay between the respective ghost component and the main (desired) component of the ghost contaminated video signal. The resulting delayed digital samples are multiplied with an appropriate coefficient to generate the digital samples of the psuedo ghost signal.

10 Claims, 5 Drawing Figures

DIGITAL DEGHOSTING SYSTEM

The present invention concerns a digital deghosting system.

Ghost images can be produced on the screen of a television receiver when both the desired RF signal for a selected channel and time delayed versions of the same RF signal are received by the tuner. The desired and delayed RF signals are demodulated to form desired and delayed video signals from which a main and ghost image is produced. In the case of broadcast channels, delayed RF signals may be produced when the transmitted RF signal is reflected from objects, such as building or mountains. In the case of cable channels, delayed RF signals may be produced when the desired RF signal is reflected from improper cable terminations in the cable distribution system. When there are multiple delayed RF signals, as when a transmitted RF signal is reflected by more than one object, multiple ghost images may be produced.

Many analog systems have been proposed for eliminating ghost images. Generally, they may be categorized as being one of two types.

In the first type of "deghoster" system, the ghost contaminated video signal is delayed in time by a time delay equal to the time delay between the main component and the ghost component and the amplitude of the delayed video signal is adjusted so that the amplitude of its main component equals the amplitude of the ghost component of the original (undelayed) video signal. The resulting signal, often referred to as a psuedo ghost signal, is subtracted from the contaminated video signal so that the ghost component is cancelled. The time delay of the pseudo ghost signal can be provided by a variable delay line comprising a charge coupled delay device (CCD) with a continuously variable frequency clock signal generator. The amplitude of the psuedo ghost signal can be controlled by an adjustable attenuator.

In the second type of deghoster system, the contaminated video signal is delayed by successive stages of a fixed delay line (such as a CCD). At the output (or tap) of each stage the respective delayed signal is extracted and its amplitude is adjusted (or weighted) so that when all the delayed and weighted signals are combined they form a psuedo ghost signal suitable for cancelling the ghost component of the main video signal. The second type of deghoster is often referred to as transversal filter deghoster and is advantageous over the first because the number of available delay signals can be used to eliminate multiple ghosts.

In either type of deghoster system, the psuedo ghost signal also contains a ghost component of the main component since it is formed by delaying the ghost contaminated video signal. Accordingly, the output signal of the deghoster will contain an uncancelled secondary ghost component corresponding to the ghost component of the psuedo ghost signal. Secondary ghosts may be eliminated by feeding the output signal of the deghoster back to the input of the delay device in a recursive configuration.

Since digital systems for processing television signals are expected to be less expensive than conventional analog systems, the former requiring fewer discrete components and fewer component adjustments, and offer the possibility of many new features, it is expected that many television receivers will comprise digital signal processing sections. Accordingly, it is desirable to provide a digital deghoster system which can be incorporated with such a digital processing section.

While a plural-bit shift register and a variable frequency clock signal generator can be used to variably delay digital samples, a digital version of the type of analog deghoster employing a variable delay line incorporating such digital delay structure would not be desirable since varying the frequency of the clock signal in a digital television processing system alters phase and time delay relationships which are required for a proper reproduced image.

The transversal filter type of deghoster generally requires an amplitude weighting circuit for each tap. In deghosters of this type there may be as many as 128 taps and 128 amplitude weighting circuits. While expensive, this can be accomplished in analog form at a reasonable cost since there is only a single signal processed at each tap and the amplitude weighting devices may simply comprise voltage dividers. However, the digital form of the same arrangement is not practical for economic reasons since the signal at each tap is a plural (e.g., 8) bit signal and the amplitude weighting devices comprise relatively complex digital multipliers.

In accordance with an aspect of the present invention, a digital deghoster which may be incorporated in a digital video signal processing system includes a number of channels each for generating digital samples of a respective psuedo ghost signal for cancelling a corresponding ghost. The number of channels is small, eg., 4, and typically much smaller than the number of taps, e.g. 128, provided in a transversal filter deghoster. Each channel includes a respective controllable delay element for imparting a time delay to digital samples of a video signal equal to the interger number of cycles of the system sampling clock between the main component and the respective ghost component. The delayed digital samples are modified in magnitude by multiplying them with a coefficient to produce digital samples of the respective psuedo ghost signal. The digital samples of the various psuedo signals are added to digital samples of the ghost contaminated video signal in a digital adder to remove digital samples of respective ghost components. In a recursive configuration, the digital samples produced at the output of the adder are fed back to the inputs of delay elements.

In a preferred embodiment of the invention, a counter is enabled to count cycles of the sampling signal in a measurement interval, such as during the duration of one of the serrations of the vertical synchronization pulse interval, which is supposed to be free of transitions other than the one beginning the measurement interval. Upon the detection of successive transitions after the one beginning of the measurement interval, corresponding to respective ghosts, the contents of the counter are stored in latches or registers of respective channels. The contents of the counter for any given transition corresponds to the time delay between the corresponding ghost and the main component.

Each delay element includes a random access memory (RAM) and a counter which counts in response to cycles of the sampling signal. The contents of the counter represent addresses of the memory locations of the RAM. At each count an old digital sample is read out of the correspondingly addressed memory location and a new sample is read into the same memory location. The counter is caused to cyclically count the number represented by the contents of the respective latch.

As a result, digital samples in the channel will be delayed according to the number of the latch.

These and other features of the present invention are described with reference to the accompanying Drawings in which.

In the Drawings, the following terminology is used to identify various inputs and outputs of logic elements.

ADD: plural bit address input of a memory or multiplexer

CL: clock input of a counter or flip-flop

D: single bit data input of a D type flip-flop

EN: enable input for enabling a counter to count or a multiplexer to switch according to the address input I: plural bit data input of a latch, counter or memory L: latch input for causing input data to be entered into a latch or counter O: plural bit output of a latch, counter or memory Q: single bit set output of a flip-flop R: single bit reset input for resetting a flip-flop R/W: read/write control input of a memory S: single bit set input for setting a flip-flop In addition, in the Drawings, plural bit signal paths are indicated by lines with a cross mark through it.

Figure 1:
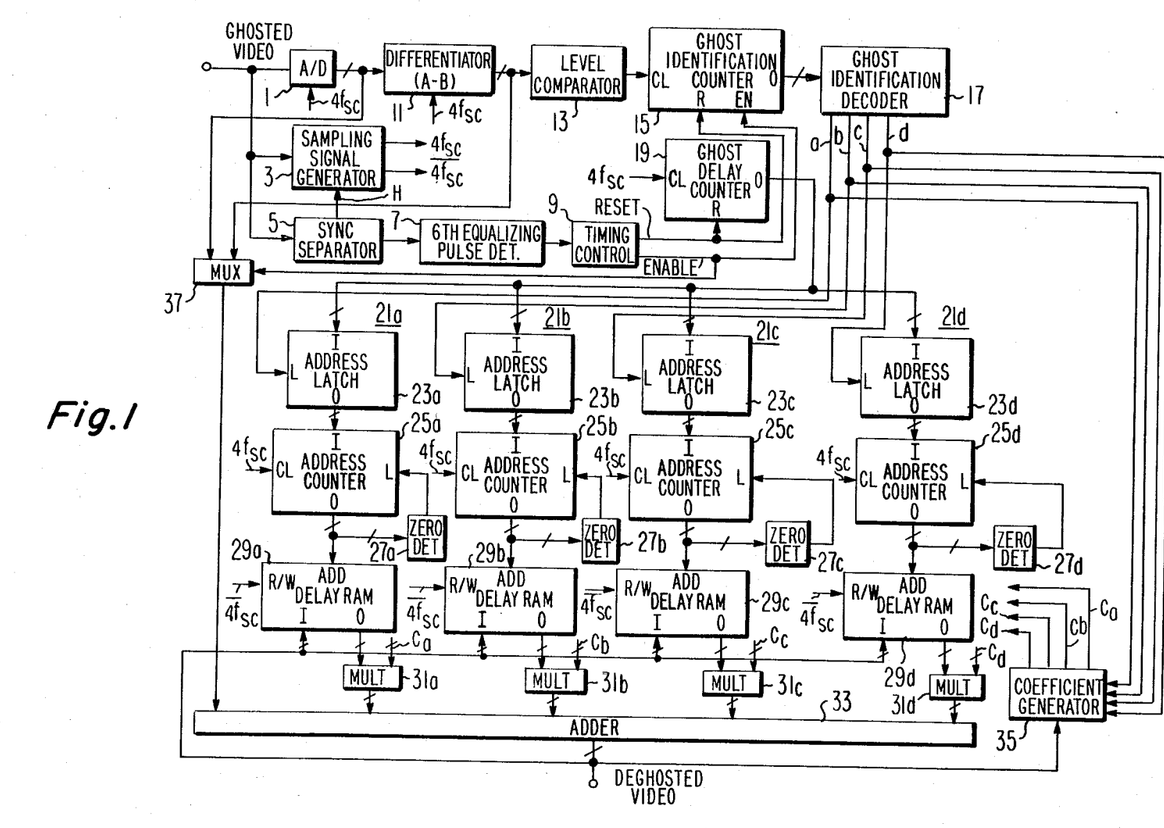
FIG. 1 is a schematic, partially in block diagram form and partially in logic diagram form, of a preferred embodiment of the present invention.

In FIG. 1, an analog-to-digital (A/D) converter 1 of a digital video processing system converts an analog video signal, e.g., received for a syndronous detector of a television receiver, to digital samples. The sampling signal for A/D converter 1 has a frequency of four times the frequency of the color subcarrier ($4f_{sc}$) and is derived from the color burst component of the analog video signal by a sampling signal generator 3. In a well known manner, sampling signal generator 3 extracts the color burst components of horizontal line intervals of the video signal in response to gating pulses. The gating pulses are generated within sampling signal generator 3 just after respective horizontal retrace pulses (H) provided by a conventional analog "sync" separator 5 which removes the composite synchronization signal from the analog video signal and separates it into component horizontal and vertical deflection synchronization signals. The color burst components, which have the color subcarrier frequency, $f_{sc}$, are used as frequency reference signals of a phase locked loop which locks the frequency of a controlled oscillator to $4f_{sc}$.

A detector 7, responsive to the composite synchronization signal, detects the last (sixth) pre-equalizing pulse preceding the vertical synchronization pulse interval. In response to the first transition thereafter, indicating the beginning of the vertical synchronization pulse interval, a deghoster timing control unit 9 (shown in detail in FIG. 2) initiates the operation of the deghoster apparatus which comprises the remaining structure shown in FIG. 1.

The deghoster detects the occurrence of ghosts components in the video signal by examining the occurrence of transitions of the video during the first serration of the vertical synchronization pulse interval. In the absence of ghost contamination, after the leading (e.g., negative-going) step of the first serration of the synchronization pulse there should be no further transitions until the end of the first serration about one-half a horizontal line interval latter. However, when ghost contamination exists, there will be one or more ghosts of the leading step during the first serration. The time delays between the leading step and its ghosts correspond to the time delays between the main (i.e., desired) and ghost components of the active (i.e., on-screen) portion of the video signal. The time delays between the leading step of the first serration and its ghosts are measured to generate digital samples of psuedo ghost signals for cancelling respective ghost components of the video signal in the following manner.

Transitions in the video signal are detected by a digital differentiator 11 which subtracts the next digital video sample (B) from the last (A). Differentiator 11 may simply comprise a two-stage plural bit shift register clocked by the sampling signal and a subtractor for subtracting the contents of the second stage of the shift register from the first. A digital comparator 13 compares the magnitude of the digital difference samples to a digital word representing a predetermined threshold magnitude and generates a pulse each time the magnitude of a digital difference sample exceeds the threshold pre-determined magnitude. The latter minimizes the possibility of the deghoster responding to noise components.

Under the control of timing control unit 9, a counter 15 is reset to a zero count condition immediately after the leading edge of the first serration of the vertical synchronization pulse interval and is thereafter enabled to count transition representative pulses produced by comparator 13. Each count of counter 15 identifies a corresponding ghost of the leading edge of the first serration. A decoder 17 generates a pulse for each new count of counter 15. These pulses (a,b,c and d) enable the operation of respective channels for generating digital samples of psuedo ghost signals for cancelling respective ghosts of the video signal.

Under the control of timing control unit 9, a counter 19 is also reset to a zero count condition immediately after the leading edge of the first serration vertical synchronization pulse interval and is thereafter enabled to count cycles of the $4f_{sc}$ sampling signal. Therefore, as each ghost transition is identified by counter 15 and decoder 17, its time delay from the transition of the leading edge of the first serration of the vertical synchronization pulse interval is determined in terms of the number of the cycles of the $4f_{sc}$ sampling signal that have been counted by counter 19. Thus, the time delay of ghosts can be determined with a resolution of one cycle of the sampling signal. In the United States, where the color subcarrier has a frequency of 3.58 mHz, with a sampling signal frequency of $4f_{sc}$, the time delay of the ghosts can be determined with a resolution of 70 nanoseconds. This has been found to be sufficient since the rise and fall times of transitions of the video signal are limited by the response of filters e.g., of the IF section, preceeding A/D converter 1 to greater than 70 nanoseconds.

Assuming that there can be as many as four ghosts, four channels 21a, 21b, 21c and 21d are provided for generating digital samples of four respective psuedo ghost signals. Since the channels are identical in structure only one (21a) need be described in detail.

Channel 21a includes a latch or storage register 23a for storing the count of ghost delay counter 19 at the time when pulse "a" identifying, e.g., the first ghost transition, is generated. Contents of latch 23 are entered ("latched") into a down counter 25a in response to a pulse generated by a zero count detector 27a as will be described below. The count of counter 25a is decreased by one in response to each cycle of the $4f_{sc}$ sampling signal. Each count of counter 25a corresponds to the address of a memory location of random access memory (RAM) 29a. The complement of the $4f_{sc}$ sampling signal is coupled to the read/write (R/W) control input of RAM 29a. At each count (or address) of counter 25a, a digital video sample previously stored in the addressed memory location is "read out" to the output of RAM 29a during the high logic level portion of the complement of sampling signal and a new digital video sample is "written into" the same memory location from the input of RAM 29a during the following low logic level portion of the complement of the sampling signal. When the count of counter 25a reaches zero, detector 27a generates a pulse which causes the contents of latch 23a to once again be entered into counter 25a. Thus, it takes the number of cycles of the $4f_{sc}$ sampling signal stored in latch 23a for a given memory location of RAM 29a to be addressed consecutively and therefore for a given digital video sample to be written into and read out of RAM 29a. Accordingly, a delay equal to the number stored in latch 23a times the period of the sampling signal is imparted to each digital video sample between the input and output of RAM 29a.

A digital multiplier 31a multiplies the delayed digital video samples produced by RAM 29a with a digital word representing a coefficient $C_a$ generated by a generator 35 to produce digital samples of the respective psuedo ghost signal. The digital of the samples of the various psuedo ghost signals are added with the digital samples of the contaminated video signal in a digital adder 33 to produce digital samples of a "deghosted" video signal.

Coefficient generator 35 examines the digital samples of the deghosted video signals at the times that the ghost transitions occur in the contaminated ghost signal in response to ghost identifying pulses a, b, c and d generated by decoder 17 to generate respective coefficients $C_a$, $C_b$, $C_c$ and $C_d$. The coefficients are adjusted in polarity and magnitude until the respective ghost components of the deghosted video signal are at a minimum.

As explained earlier, while the addition of psuedo ghost signals to a ghost contaminated video signal rids the contaminated video signal of the primary ghosts, it undesirably introduces secondary ghosts which are delayed versions of the primary ghosts. In the arrangement shown in FIG. 1, the digital samples of the video signal that are coupled to the inputs of RAMS 29a, b, c and d are those of the deghosted video signal produced at the output of adder 33. This recursive type of feedback causes the digital samples of the secondary ghost components to be cancelled by delayed versions of the digital samples of main component of the video signal with equal magnitudes but opposite polarities which are successively developed at the outputs of the various psuedo ghost generation channel.

In order for coefficient generator 35 to examine the amplitude of the digital samples of the ghost components produced at the output of adder 33 in order to control the coefficients, it must do so without interference from digital samples of the desired video signal or from digital samples of earlier occurring ghost components. For that reason, the digital samples representing the transitions in the ghost contaminated video signal rather than the digital samples of the contaminated video signal itself are used to control the time delay and magnitude of the digital samples of the psuedo ghost signals. After the measurement interval, i.e., the duration of first serration of the vertical synchronization pulse interval, in order that the deghoster can cancel ghost components in the active portion of the video signal in the same manner as cancels ghosts of the leading edge of the first serration of the vertical synchronization pulse interval, the digital samples of the contaminated video signal rather than those corresponding to the transitions of the contaminated video signal must be coupled to the respective input of adder 33. For that purpose a multiplexer (MUX) 37 is provided for coupling the digital transition samples produced at the output of digital differentiator 11 to the respective input of adder 33 during the measurement interval and at other times coupling the digital video samples produced at the output A/D converter 1 to adder 33. Multiplexer 37 is controlled in response to a timing signal generated by timing control unit 9.

Figure 2:
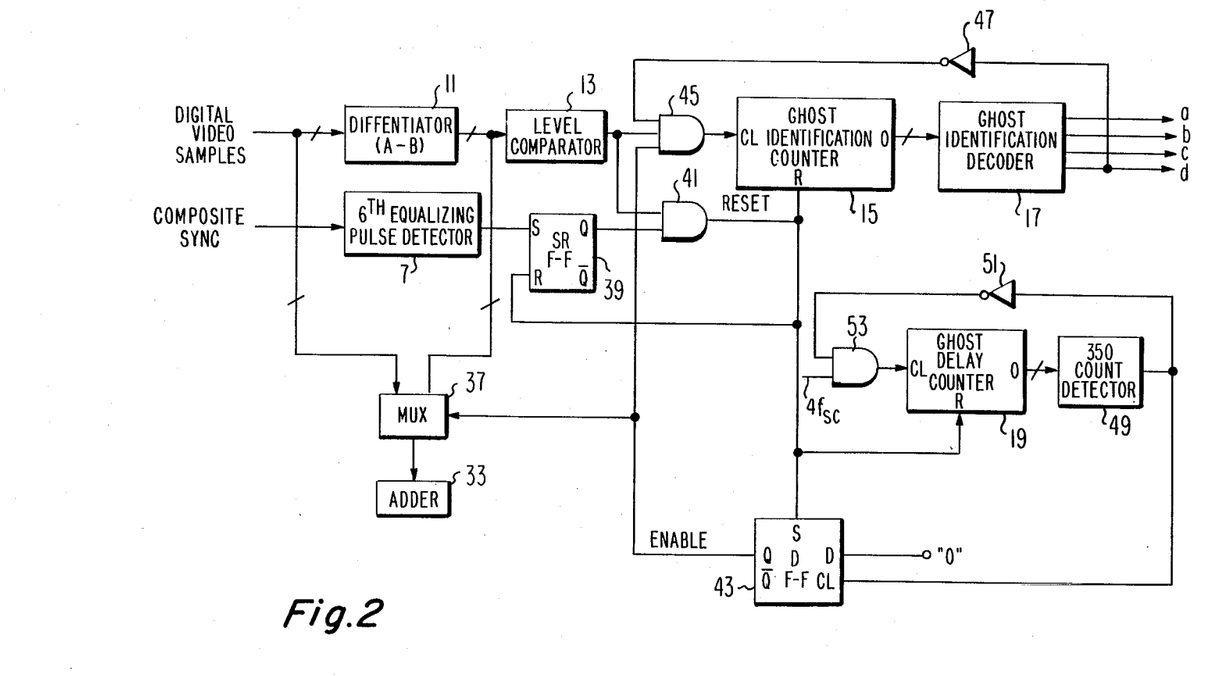
FIGS. 2, 3, 4 and 5 are schematics, in logic diagram form, of various portions of the preferred embodiment shown in FIG. 1 in block form.

An implementation of timing control unit 9 shown in block form in FIG. 1 and its cooperation with ghost identification counter 15, ghost identification decoder 17, ghost delay counter 19 and multiplexer 37 is shown in FIG. 2. Detector 7 generates a positive-going pulse having a duration of slightly less than one-half a horizontal line interval after the detection of the last (sixth) pre-equalizing pulse. This pulse sets a set-reset flip-flop 39 which in turn enables an "and" gate 41 to couple positive-going pulses from its input to its output. The very first transition thereafter exceeding the predetermined threshold corresponds to the transition of the leading edge of the first serration of the vertical synchronization pulse interval and the corresponding pulse produced by level comparator 13 passes through enabled "and" gate 41 and resets counters 15 and 19. This synchronizes the beginning of the measurement interval with the digital sample representing the transition of the leading edge of the first serration of the vertical synchronization pulse interval so that this sample is not erroneously interpreted as a ghost.

The pulse produced at the output of "and" gate 41 sets a data type flip-flop 43 which in turn enables an "and" gate 45 to pass pulses produced by level comparator 13 to the clock input of counter 15. In addition, when flip-flop 43 is set, multiplexer 37 is caused to couple the digital samples produced at the output of differentiator 11 coupled to one of its input to its output and thereby to adder 33.

When four successive ghosts have been identified, a high logic level is produced at the corresponding "d" output of decoder 17. The high logic level produced at the "d" output of decoder 17 is inverted by an inverter 47 and the resulting low logic level disables "and" gate 45. As a result, ghost identification counter 15 is disabled from responding to ghost transitions after the fourth one. If there should be more than four ghosts, an unlikely but possible occurrence, this prevents the four psuedo ghost channels for the first four ghosts from being set to provide erroneous time delays corresponding to later ghosts. "And" gate 45 is again enabled to couple pulse to the clock input of counter 15 when counter 15 is reset in the next field when the leading edge of the first serration of the vertical synchronization pulse is again produced.

A detector 49 detects when ghost delay counter 19 has counted 350 cycles of the $4f_{sc}$ sampling signal and in response generates a positive-going pulse. A count of 350 with the period of the sampling signal at 70 nanoseconds corresponds to a little less than one-half the horizontal line scanning interval which is approximately the duration of the first serration of the vertical synchronization pulse interval. At that point, the measurement interval is at an end and in response to the positive-going pulse generated by detector 49 data flip-flop is reset (because the low logic level coupled to its data input is "clocked in" in response to the positive-going pulse coupled to its clock input). When flip-flop 43 is reset multiplexer 37 is caused to couple the output of A/D converter 1 instead of the output of differentiator 11 to the respective input of adder 33. In addition, "and" gate 45 is disabled thereby preventing ghost counter 15 from counting further transitions of the video signal. Further, ghost delay counter 19 is disabled from counting cycles of the $4f_{sc}$ sampling signal by detector 49, an inverter 51 and an "and" gate 53 when it reaches a count of 350 until the reset signal is again generated. This prevents flip-flop 43 from being improperly reset at the beginning of the measurement interval due to a race condition between the generation of its set signal and counter 19 reaching a count of 350 at the same time.

Figure 3:
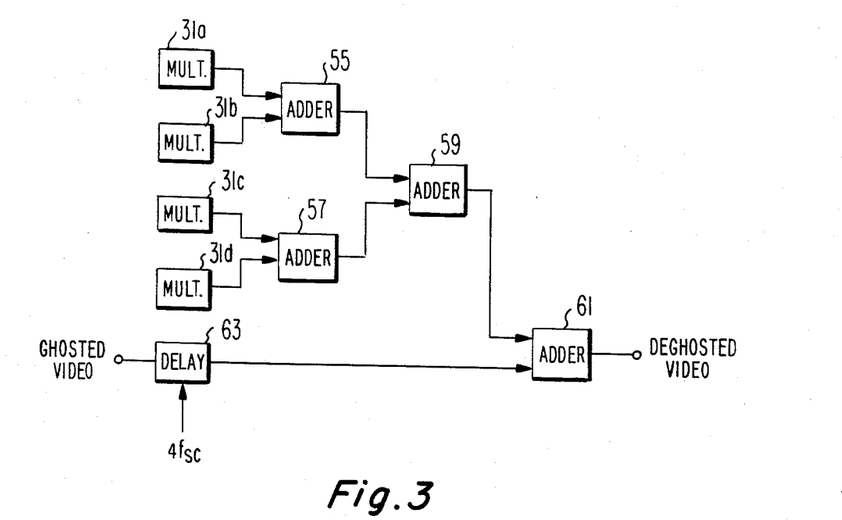

An implementation of adder 33 shown in block form in FIG. 1 is shown in FIG. 3. As is shown, adder 33 includes four "two-input" adders 55, 57, 59 and 61, arranged in a conventional adder "tree". A delay unit 63 delays the digital samples of ghost contaminated video input signal so as to equalize the time delay encountered in the path for the digital samples of the contaminated video signal with those in the paths comprising adders 55 and 59 and 57 and 59. For this purpose delay unit 63 should, e.g., provide a delay of two cycles of the sampling signal. Delay unit 63 should also provide an additional delay to compensate for the one cycle delay needed for address counters 25a, b, c and d to be loaded with the contents of ghost delay counter 19. Thus delay unit 63 may simply comprise a three stage plural bit shift register clocked by the $4f_{sc}$ sampling signal.

Figure 4:
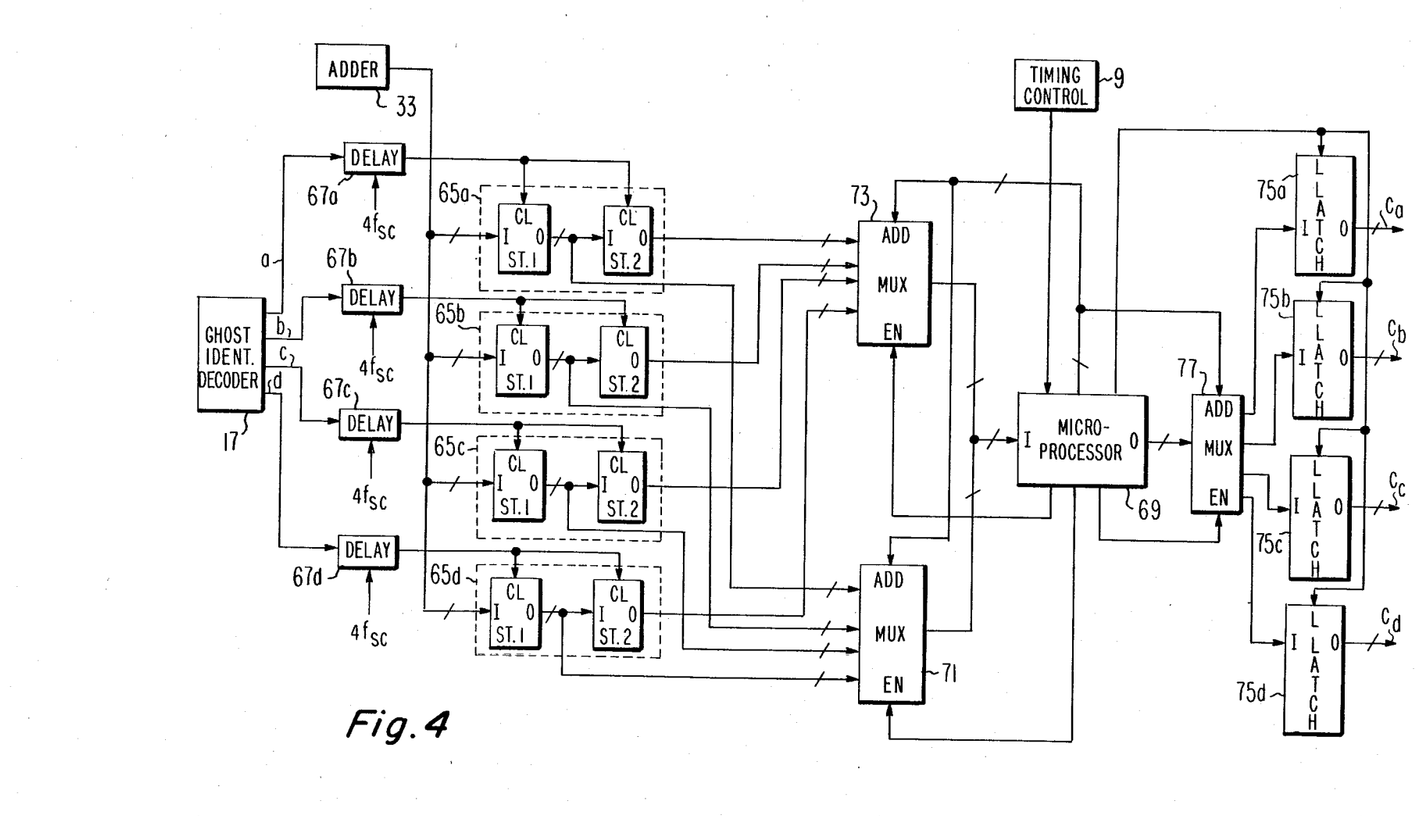

An implementation of coefficient generator 35 shown in block form in FIG. 1 is shown in FIG. 4. The digital samples produced at the output of adder 33 are coupled in parallel to the first stages of four two stage plural bit shift registers 65a, b, c and d into which they are entered in response to respective delayed versions of respective ghost identification pulses a, b, c and d produced by ghost identification decoder 17. The delayed version of ghost identification pulses a, b, c and d are produced by respective delay units 67a, b, c and d. The delay of delay units 67a, b, c and d is selected to match that imparted to digital samples processed in adder 33, i.e., three cycles of the $4f_{sc}$ sampling signal. Delay units 67a, b, c and d may simply comprise a three stage single-bit shift register clocked by the sampling signal. When a new digital sample is entered into the first stage of one of shift registers 65a, b, c and d, the previously stored sample is shifted into the second stage. Thus, two consecutive samples taken at the time that the respective ghost transition occurs are stored in each shift register.

The consecutive samples stored in each shift register are coupled to data inputs a microprocessor or microcontroller 69 through multiplexers 71 and 73 during the field following the measurement interval starting at a suitable time after a reset signal is generated by timing control unit 13. Multiplexer 71 is enabled by microprocessor 69 to successively couple the digital samples stored in the first stages of shift registers 65a, b, c and d to a data input of microprocessor 69 in response to respective address words also generated by microprocessor 69. Multiplexer 73 is enabled to successively couple the digital samples stored in the second stages of shift registers 65a, b, c and d to the data input of microprocessor 69 in the same fashion.

Microprocessor 69 under program control examines the digital samples to generate digital words representing coefficients $C_a$, $C_b$, $C_d$ and $C_e$. Many algorithms are known for generating weighting coefficients for deghoster systems. By way of example, the coefficients can first be set to reduce the absolute magnitude of the respective ghost in a so called "zero forcing" algorithm. Thereafter, the coefficients can be set to reduce the difference between successive samples of the respective ghost in a so called "gradient" algorithm. Further details of these algorithms can be found in a paper entitled "Ghost Clean System" by Junzo Murakami, Hiroyuki Iga and Shigeyoshi Takehara presented at the 1983 IEEE International Conference on Consumer Electronics June 8–10, 1983, Chicago, Ill.

The digital words representing coefficients $C_a$, $C_b$, $C_c$ and $C_d$ are successively coupled to and entered into respective latches 75a, b, c and d through a multiplexer 77, when it is enabled by microprocessor 69, in response to respective address words and latch pulses generated by microprocessor 69.

To reduce errors in the measurement of the time delays between the main and various ghost components of the video signal it may be desirable to verify that two or more consecutive time delay representative counts generated by ghost delay counter 19 for a respective ghost are identical. Along these lines, the arrangement shown in FIG. 5 comprising a two-stage plural bit shift register 79, digital comparator 81 and latch 83 may be used in place of address latches 23a, b, c and d to enter the contents of respective address counter 25a, b, c and d only after two consecutive time delay representative counts have been found to be identical. The arrangement is shown by way of example as being incorporated in psuedo ghost channel 21a.

Figure 5:
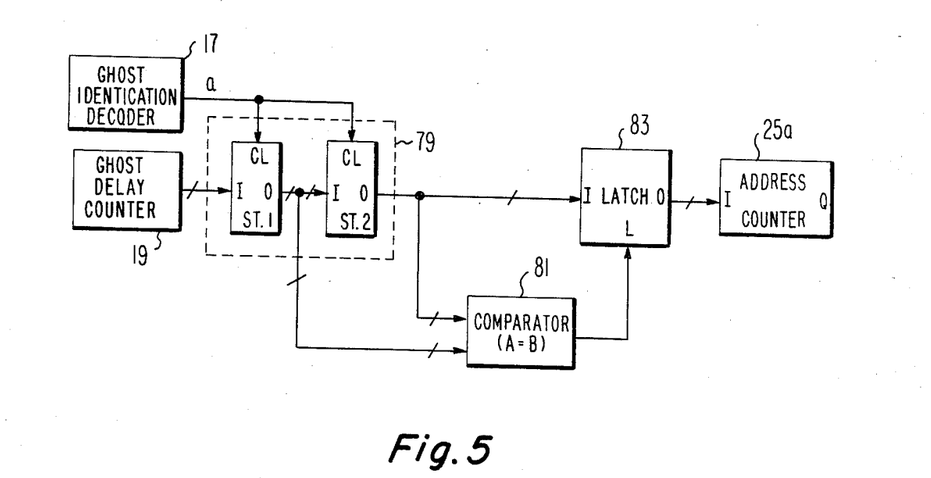

In the arrangement of FIG. 5, two consecutive counts (A and B) representing the time delay of ghost "a" are stored in the first and second stages of shift register 79 in response to the generation of two consecutive ghost "a" identification pulses by decoder 17. These counts are compared by comparator 81. Only if equality exists is the first count (A) entered into latch 83. Latch 83 cooperates with address counter 25a in the same manner as latch 23a of the arrangement shown in FIG. 1.

What is claimed is:
1. In a digital video processing system including analog-to-digital converter, means responsive to an analog video signal having a desired main component and undesired ghost components and a sampling signal for producing digital samples of said analog video signal, a deghosting apparatus, comprising:
   ghost identification means for identifying a predetermined number of said ghost components;
   ghost delay detection means for counting cycles of said sampling signal to generate counts representing the delay between said ghost components and said main component of said video signal;
   a plurality of channels each responsive to said digital samples for generating digital samples of a psuedo ghost component of a respective one of said ghost components; each of said channels including digital delay means coupled to said ghost delay detection means and said ghost identification means for delaying said digital samples of said video signal by incremental delays equal of the number of cycles of said sampling signal counted by said ghost delay detection means when the respective one of said ghosts is identified by said ghost identification means to produce delayed digital samples; and a digital multiplier for multiplying said delayed samples by a coefficient to generate said digital samples of said respective one psuedo ghost signals; and digital summing means for additively combining said digital samples of said video signal with said digital samples of said psuedo ghost signals to produce digital samples of a deghosted version of said video signal.

2. The apparatus recited in claim 1 wherein:

said digital samples produced by said summing means are coupled to said digital delay means of said various channels to be delayed thereby.

3. The apparatus recited in claim 1 wherein each one of said digital delay includes a random access memory having a plurality of memory locations; address means for sequentially addressing a number of said memory locations related to the count of said ghost delay detection means corresponding to the respective one of said ghosts and read/write means for writing from and thereafter for reading into an addressed one of said memory locations digital samples of said video signal to produce said delayed digital samples.

4. The apparatus recited in claim 3 wherein:

said digital samples produced by said summing means are coupled to said digital delay means to be delayed thereby.

5. The apparatus recited in claim 1 wherein:

each of said digital delay means includes a latch coupled to said ghost delay detection means and said ghost identification means for storing the count of said ghost detection means corresponding to said respective ghost; first counter means coupled to said latch and to said sampling signal for repetitively counting a number of cycles of said sampling signal corresponding to the contents of said latch; a random access memory having a plurality of memory locations, a data input to which said digital samples of said video signal are coupled, a data output at which said delay samples are produced; address means for sequentially addressing said memory locations of said memory in response to the contents of said first counter means; and read/write means for writing digital samples stored in a presently addressed said memory location to said output and thereafter for reading said digital samples then at said input into the same memory location.

6. The apparatus recited in claim 5 wherein:

said digital samples produced by said summing means are coupled to said data inputs of said random access memories of said various channels.

7. The apparatus recited in claim 5 wherein:

said ghost identification means includes digital differentiation means for subtracting successive digital samples of said video signal to produce digital samples corresponding to transitions in said video signal; digital level comparator means for generating a pulse when the magnitude of any of said digital samples representing transitions in said video signal exceeds a predetermined threshold level; and second counter means for counting said pulses produced by said digital level comparator means after the occurrence of a transition in said video signal at the beginning of a predetermined interval in which, in the absence of said ghost components there are no further transitions; and decoder means for generating a pulse each time the count of said second counter means changes;

said ghost delay detection means includes third counter means for counting cycles of said sampling signal during said predetermined interval; and said third counter means is coupled to the respective one of said latches so that its contents are stored in the respective of said latches in response to the respective one of said pulses produced by said decoder means.

8. The apparatus recited in claim 1 wherein:

said ghost identification means includes transition detection means for detecting transitions in said video signal which occur after a transition marking the beginning of a predetermined interval in which, in the absence of said ghost components, there are no further transitions; first counter means for counting ones of said transitions exceeding a predetermined magnitude; and decoder means for producing a pulse representing the occurrence of one of said ghost components when the count of said first counter means changes;

said ghost delay detection means includes second counter means for counting cycles of said sampling signal during said predetermined interval; and each of said digital delay means includes register means coupled to said decoder means and to said second counter means for storing the contents of said second counter means in response to the generation of a respective one of said pulses produced by said decoder means, the contents of said register means being coupled to said respective digital delay means to determine the number of cycles of said sampling signal by which said digital samples of said video signal are to be delayed by said respective digital delay means.

9. The apparatus recited in claim 8 wherein:

said digital delay means further includes a random access memory having a plurality of addressable memory locations; address means coupled to said respective register means for sequentially addressing a number of said memory locations represented by the contents of said register means; and read/write means for writing from and thereafter for reading into an addressed one of said memory locations digital samples of said video signal to produce said delayed digital samples.

10. The apparatus recited in claim 9 wherein:

said digital samples produced by said summing means are coupled to said digital delay means to be delayed thereby.

* * * * *

UNITED STATES PATENT AND TRADEMARK OFFICE
CERTIFICATE OF CORRECTION

PATENT NO.   : 4,542,408
DATED        : September 17, 1985
INVENTOR(S)  : Henry Garton Lewis, Jr.

It is certified that error appears in the above-identified patent and that said Letters Patent is hereby corrected as shown below:

Column 9, line 4, "of" (first occurrence) should be -- to --.

Column 9, Claim 3, line 22, after "delay" insert -- means --.

Signed and Sealed this

Fifteenth Day of April 1986

[SEAL]

Attest:

DONALD J. QUIGG

Attesting Officer

Commissioner of Patents and Trademarks